United States Patent
Yoo et al.

(10) Patent No.: US 6,898,659 B2
(45) Date of Patent: May 24, 2005

(54) INTERFACE DEVICE HAVING VARIABLE DATA TRANSFER MODE AND OPERATION METHOD THEREOF

(75) Inventors: Young-Doo Yoo, Suwon-shi (KR); Deuk-Soo Jung, Seoul (KR)

(73) Assignee: Samsung Electronics., Co., Ltd., Suwon (KR)

( * ) Notice: Subject to any disclaimer, the term of this patent is extended or adjusted under 35 U.S.C. 154(b) by 291 days.

(21) Appl. No.: 10/364,140

(22) Filed: Feb. 11, 2003

(65) Prior Publication Data

US 2003/0221038 A1 Nov. 27, 2003

(30) Foreign Application Priority Data

May 21, 2002 (KR) ........................................ 2002-28063

(51) Int. Cl.[7] ............................................. G06F 13/36
(52) U.S. Cl. ..................................... 710/306; 710/313
(58) Field of Search ................................ 710/306–307, 710/313–315

(56) References Cited

U.S. PATENT DOCUMENTS

| | | | | |
|---|---|---|---|---|
| 5,535,341 A | * | 7/1996 | Shah et al. | 710/310 |
| 5,664,117 A | * | 9/1997 | Shah et al. | 710/100 |
| 5,761,450 A | * | 6/1998 | Shah | 710/107 |
| 5,978,866 A | * | 11/1999 | Nain | 710/22 |
| 6,292,862 B1 | * | 9/2001 | Barrenscheen et al. | 710/306 |

FOREIGN PATENT DOCUMENTS

KR 00157924 B1 8/1998 ........... G06F/13/14

* cited by examiner

Primary Examiner—Tim Vo
(74) Attorney, Agent, or Firm—F. Chau & Associates, LLC (57) ABSTRACT

An interface device according to the present invention interfaces with a host by an m-bit unit. A flag signal generator circuit generates a mode flag signal indicating whether a data transfer mode of the interface device is a multi-transfer mode. A control circuit operates responsive to information indicating whether an address from the host is a data width aligned address and whether the address thus transmitted belongs to a data width aligned address range. The control circuit causes m-bit data from the host to be continuously stored in a first-in first-out memory. Data continuously stored in the memory is at once transmitted to a high-speed bus connected to the interface device.

22 Claims, 8 Drawing Sheets

[ Single Transfer Mode ]

[ Multi-Transfer Mode ]

[ Single Transfer Mode ]

[ Multi-Transfer Mode ]

Fig. 6B

INTERFACE DEVICE HAVING VARIABLE DATA TRANSFER MODE AND OPERATION METHOD THEREOF

This application claims priority to Korean Patent Application No. 2002-28063, filed on May 21, 2002, the contents of which are herein incorporated by reference in their entirety.

BACKGROUND OF THE INVENTION

1. Field of the Invention

The present invention is related to interface devices, and in particular to an interface device which performs an interface function between a high-speed bus and a low-speed bus.

2. Discussion of the Related Art

Deep sub-micron (DSM) process geometries, and in particular DSM system on chip (SOC) designs, represent the current state of the art in chip design. With SOC designs, an entire system is implemented on one chip. Accordingly, many elements of the system share a bus architecture. Performance of the system is dependant upon efficient use of the shared bus. In the case of SOC designs, there are several widely used interface methods, such as PCI (peripheral component interface), 32-bit PC card (referred to as CardBus), and PCMCIA (Personal Computer Memory Card International Association). Regarding operational speed and data transfer efficiency, the PCI and PC card have superior performance as compared with the PCMCIA.

However, as compared with the PCMCIA, the PCI and 32-bit PC card have complex circuits and communication protocols. For small SOC chips, the PCI and 32-bit PC card are inappropriate for interfacing with a host because their size. That is, since the PCI and 32-bit PC card are intended to transmit 32-bit data, they are inappropriate to a host system for transmitting only 8-bit or 16-bit data, considering circuit area and complexity. On the other hand, since the communication protocol of the PCMCIA is relatively simple and its size is small, the PCMCIA is appropriate for a host system that transmits 8-bit or 16-bit data. For this reason, PCMCIA has been widely used in mobile applications. PCMCIA is a PC card for interfacing with a host by an 8-bit/16-bit unit and is mainly used as a memory interface.

PCMCIA, as described above, has advantages such as a small size, a simple communication protocol, and a mobile application. However, many systems have a 32-bit or wider data width bus architecture and use a clock speed greater than that of PCMCIA. Systems or SOCs having a 32-bit bus architecture include a plurality of masters. One of the masters is PCMCIA.

In a 32-bit bus system, PCMCIA can transmit 16-bit data. That is, PCMCIA uses half a bus of the 32-bit bus system. In a case where the PCMCIA operates as a master in the 32-bit bus system, the performance of an entire system decreases. The reason is because when a 16-bit PCMCIA uses a 32-bit bus, the availability of the bus to 32-bit masters is reduced.

As described above, PCMCIA only transmits 16-bit data. When interfacing with another block connected to a shared bus of the SOC by the 32-bit unit, the PCMCIA must request and use the shared bus two times. Furthermore, when interfacing with another block connected to a shared bus of the SOC by the 8-bit unit, the PCMCIA must request and use the shared bus four times. Therefore, as the frequency with which the PCMCIA uses a shared bus increases, the chances that other high-speed masters can use the bus are reduced in proportion to a bus occupation frequency of the PCMCIA.

Bus contention becomes more serious as the clock speed of shared busses increase. Furthermore, where a main object of the PCMCIA is to receive data from a host and access an external memory, since a speed of the external memory is very slow, a time when the PCMCIA occupies a shared bus becomes longer.

SUMMARY OF THE INVENTION

It is therefore an object of the invention to provide an interface device capable of improving system performance.

It is another object of the invention to provide an interface device having a variable data transfer mode.

In accordance with one embodiment of the present invention, there is provided an interface device that interfaces with a host by the m-bit unit and includes an n-bit bus; a bus arbiter that arbitrates the n-bit bus; an interface device that is connected to the n-bit bus and interfaces with a host by an m-bit unit (herein, n is integral times of m); and a memory controller that is connected to the n-bit bus and controls an access to an external memory. The interface device includes a FIFO memory, a flag signal generator circuit, an address checking circuit, and a control circuit. The FIFO memory stores data. The flag signal generator circuit generates a mode flag signal indicating whether a data transfer mode of the interface device is a multi-transfer mode where n-bit data is transmitted from the interface device to the n-bit bus. The address checking circuit generates a first detection signal and a second detection signal when the mode flag signal indicates the multi-transfer mode. The first detection signal indicates whether an address from the host is a data width aligned address and the second detection signal indicates whether an address from the host belongs to a data width aligned address range. The control circuit enables m-bit data from the host to be stored continuously in the FIFO memory in response to the first and second detection signals, when the mode flag signal indicates the multi-transfer mode. When all of the n-bit data is stored in the FIFO memory, the control circuit requests a bus use from the bus arbiter, and causes the stored n-bit data to be transmitted to the n-bit bus through a bus interface when the bus use is granted.

In this preferred embodiment, when data width aligned addresses are continuously received from the host, the control circuit initializes the FIFO memory and, simultaneously, causes m-bit data, corresponding to a data width aligned address of the latter, to be stored in the FIFO memory.

In this preferred embodiment, the control circuit causes n-bit data from the n-bit bus to be stored in the FIFO memory at the multi-transfer mode. The n-bit data from the n-bit bus is stored in the FIFO memory and, simultaneously, m-bit data of the n-bit data is transmitted to the host. When an address belonging to the data width aligned address range is transmitted from the host at the multi-transfer mode, remaining data stored in the FIFO memory is transmitted to the host. A read/write operation of the FIFO memory is carried out irrespective of an address order within the data width aligned address range.

In accordance with another embodiment of the present invention, there is provided an operation method of an interface device that interfaces with a host by the m-bit unit, comprising the steps of storing m-bit data corresponding to a first address in a FIFO memory when the first address from the host is a data width aligned address, during a multi-transfer mode where n-bit data (n is integral times of m) is transmitted from the interface device to an n-bit bus; storing m-bit data corresponding to a second address in the FIFO memory when the second address belongs to a data width aligned address range; requesting a bus use from a bus arbiter when the FIFO memory is filled with the n-bit data; and transmitting the n-bit data stored in the FIFO memory to the n-bit bus when the bus use is granted.

In this preferred embodiment, the method further comprises the steps of requesting a bus use from the bus arbiter when an address is received from the host, during a single transfer mode where m-bit data is transmitted to the n-bit bus; and transmitting the m-bit data corresponding to the address onto the n-bit bus when the bus use is granted.

BRIEF DESCRIPTION OF THE DRAWINGS

A more complete appreciation of the present invention, and many of the attendant advantages thereof, will become readily apparent as the same becomes better understood by reference to the following detailed description when considered in conjuction with the accompanying drawings in which like reference symbols indicate the same or similar components, wherein.

DETAILED DESCRIPTION OF PREFERRED EMBODIMENTS

The preferred embodiment of the invention will be more fully described with reference to the attached drawings.

Figure 1:
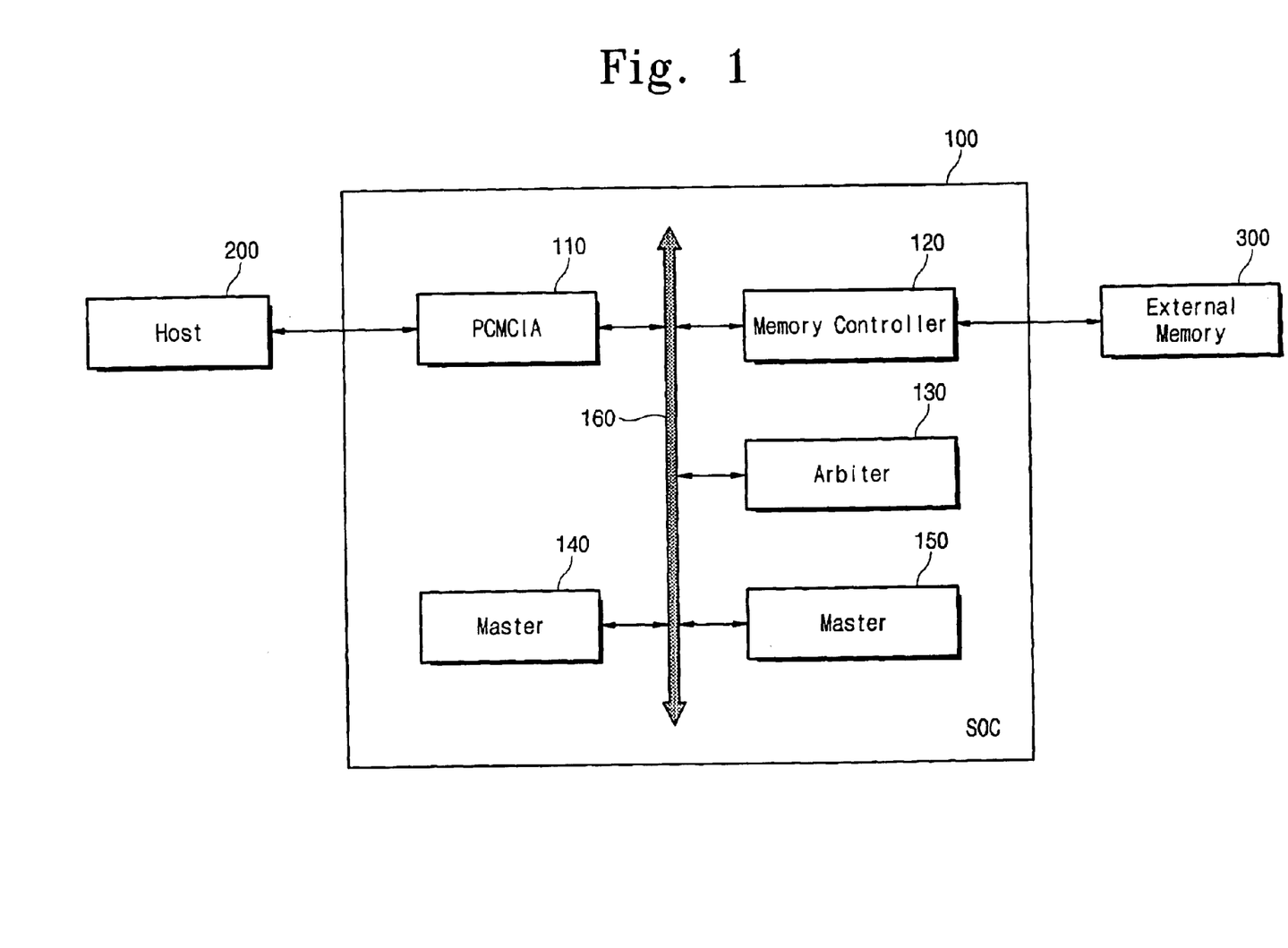
FIG. 1 is a block diagram of a system on a chip according to the present invention.

FIG. 1 shows a system on a chip (SOC) according to the present invention. Referring to FIG. 1, an SOC 100 according to the present invention comprises a PCMCIA block 110, a memory controller 120, a bus arbiter 130, and a plurality of masters 140 and 150. The SOC 100 includes an n-bit bus 160 (n is 32, 64, or more integer) to which the PCMCIA block 110, the memory controller 120, the bus arbiter 130, and the masters 140 and 150 are connected. In this embodiment, the SOC 100 has a 32-bit bus 160. The PCMCIA block 110, for example, interfaces with a host 200 by the 16-bit unit, and the memory controller 120 controls read and write operations of an external memory 300. The masters 140 and 150 include PCI, DMA, MCU, and devices that can hold the bus 160.

In that bus architecture, data transmission in the SOC 100 is accomplished using a high-speed bus 160, and other masters don't transmit data using the high-speed bus 160 when the PCMCIA block 110 transmits data. Likewise, in the case where another master uses the high-speed bus 160, the PCMCIA block 110 does not transmit data. Accordingly, overall system performance is dependant upon efficient use of the high-speed bus 160 by the masters.

Figure 2:
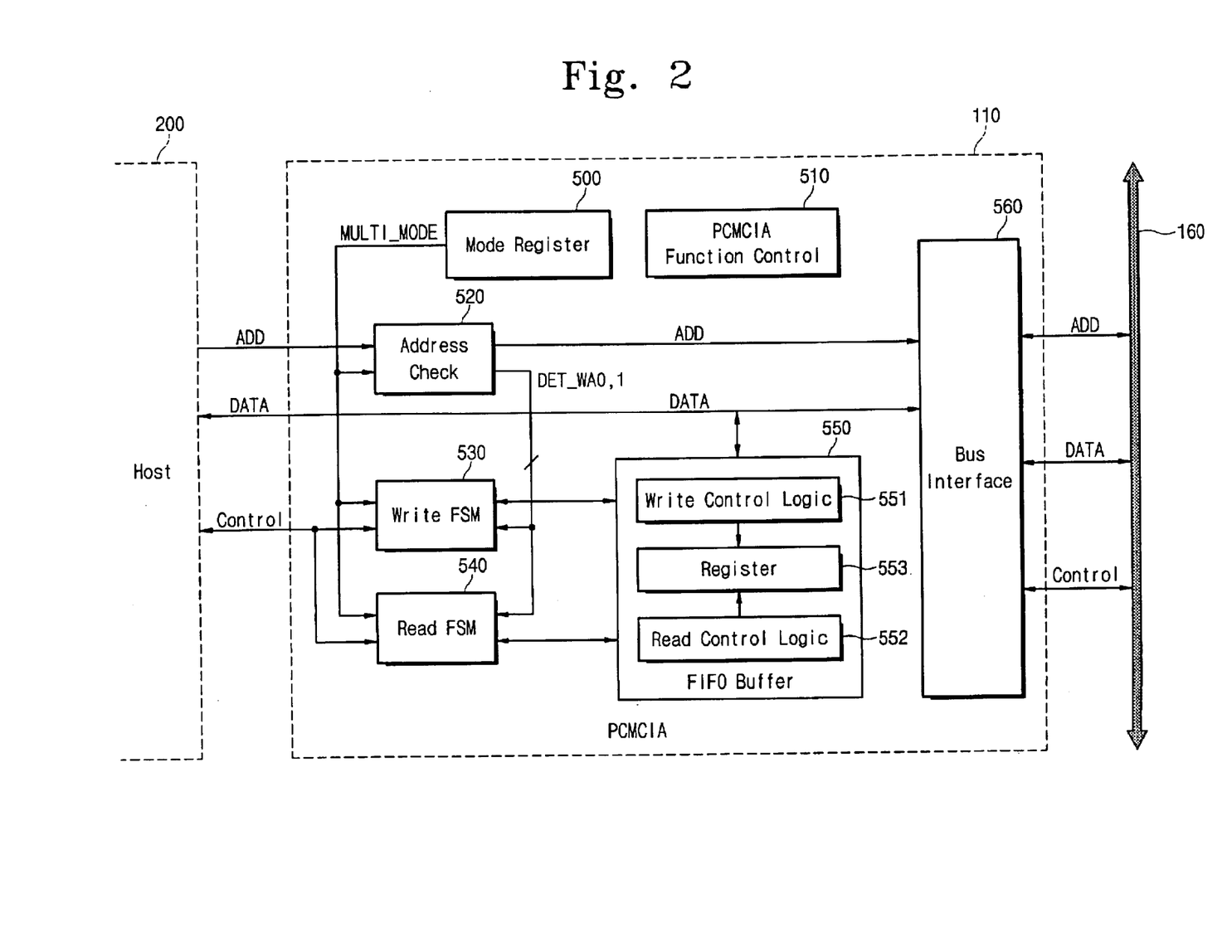
FIG. 2 is a block diagram of a PCMCIA block according to a preferred embodiment of the present invention.

FIG. 2 shows the PCMCIA block of FIG. 1 according to a preferred embodiment of the present invention. Referring to FIG. 2, the PCMCIA block 110 is integrated in an SOC 100, and interfaces with a host 200 by the 8-bit/16-bit unit. The PCMCIA block 110 has various transfer modes. For example, the PCMCIA block 110 has a single transfer mode and a multi-transfer mode. In the case of the single transfer mode, the PCMCIA block 110 directly transfers 8-bit/16-bit data provided from the host 200 to a bus 160. In the case of the multi-transfer mode, the PCMCIA block 110 continuously receives 8-bit/16-bit data provided from the host 200, temporarily stores the received data in an internal storage unit, and transfers the stored data to the bus 160 of the SOC 100 when data corresponding to a bus width of the SOC 100 is completely received. The bus 160 cannot be used by another master until data (in case of a 32-bit/64-bit data width, 32-bit/64-bit data) corresponding to the bus width of the SOC is completely received by the PCMCIA block 110.

Referring again to FIG. 2, the PCMCIA block 110 comprises a mode register 500, a PCMCIA function control circuit 510, an address checking circuit 520, a write FSM (finite state machine) 530, a read FSM 540, a FIFO (first-in first-out) buffer 550, and a bus interface 560.

As a flag signal generator circuit, the mode register 500 outputs a mode flag signal MULTI_MODE indicating whether the PCMCIA block 110 is to operate at a multi-transfer mode or a single transfer mode. A logic state of the mode flag signal MULTI_MODE is dependent on an address, data, and control signals from the host 200. The PCMCIA function control circuit 510 controls well-known basic functions of the PCMCIA block 110, and thus a description thereof will be omitted. The address checking circuit 520 operates responsive to the mode flag signal MULTI_MODE. For example, when the mode flag signal MULTI_MODE indicates the single transfer mode the address checking circuit 520 directly transmits an address ADD provided from the host 200 to the bus interface 560. When the mode flag signal MULTI_MODE indicates the multi-transfer mode the address checking circuit 520 outputs a detection signal DET_WA0 indicating whether a presently received address is an address aligned to a data width. That is, at the multi-transfer mode, the address checking circuit 520 detects whether a current address is a data width aligned address. Afterward, the address checking circuit 520 outputs a detection signal DET_WA1 indicating whether a next address belongs to a data width aligned address range.

The write FSM 530 operates responsive to the mode flag signal from the mode register 500 and receives control signals from the host 200. The write FSM 530 converts control signals, related to a write operation, from the host 200 to an appropriate communication protocol when the mode flag signal MULTI_MODE indicates the single transfer mode. When the mode flag signal MULTI_MODE indicates the multi-transfer mode, the write FSM 530 allows presently received data to be stored in the FIFO buffer 550 in response to the first and second detection signals DET_WA0 and DET_WA1. Likewise, the write FSM 530 converts control signals, related to a write operation, from the host 200 to an appropriate communication protocol of the SOC 100 when the mode flag signal MULTI_MODE indicates the single-transfer mode.

The read FSM 540 receives control signals from the host 200 and operates responsive to the mode flag signal MULTI_MODE from the mode register 500. The read FSM 540 converts control signals, related to a read operation, from the host 200 to an appropriate communication protocol when the mode flag signal MULTI_MODE indicates the single transfer mode. When the mode flag signal MULTI_MODE indicates the multi-transfer mode, the read FSM 540 allows data in the FIFO buffer 550 to be transmitted to the host 200 in response to the first and second detection signals DET_WA0 and DET_WA1. Likewise, the read FSM 540 converts control signals, related to a read operation, from the host 200 to an appropriate communication protocol of the SOC 100 when the mode flag signal MULTI_MODE indicates the single-transfer mode. Herein, the write FSM 530 and the read FSM 540 form a control circuit for controlling read and write operations of the FIFO buffer 550. This will be more fully described hereinafter.

The FIFO buffer 550 temporarily stores data and has a capacity corresponding to a bus width of the SOC 100. For example, if a bus width of the SOC 100 is a 32-bit data width, the FIFO buffer 550 has a capacity capable of storing 32-bit data. As well known, the FIFO buffer 550 can be realized using SRAM cells or flip-flops. The FIFO buffer 550 comprises a write control logic 551, a read control logic 552, and a register 553. The write control logic 551 causes data to be stored sequentially in the register 553 according to a control of the write or read FSM 530 or 540. The read control logic 552 causes data to be output sequentially from the register 553 according to a control of the write or read FSM 530 or 540.

Figure 3:
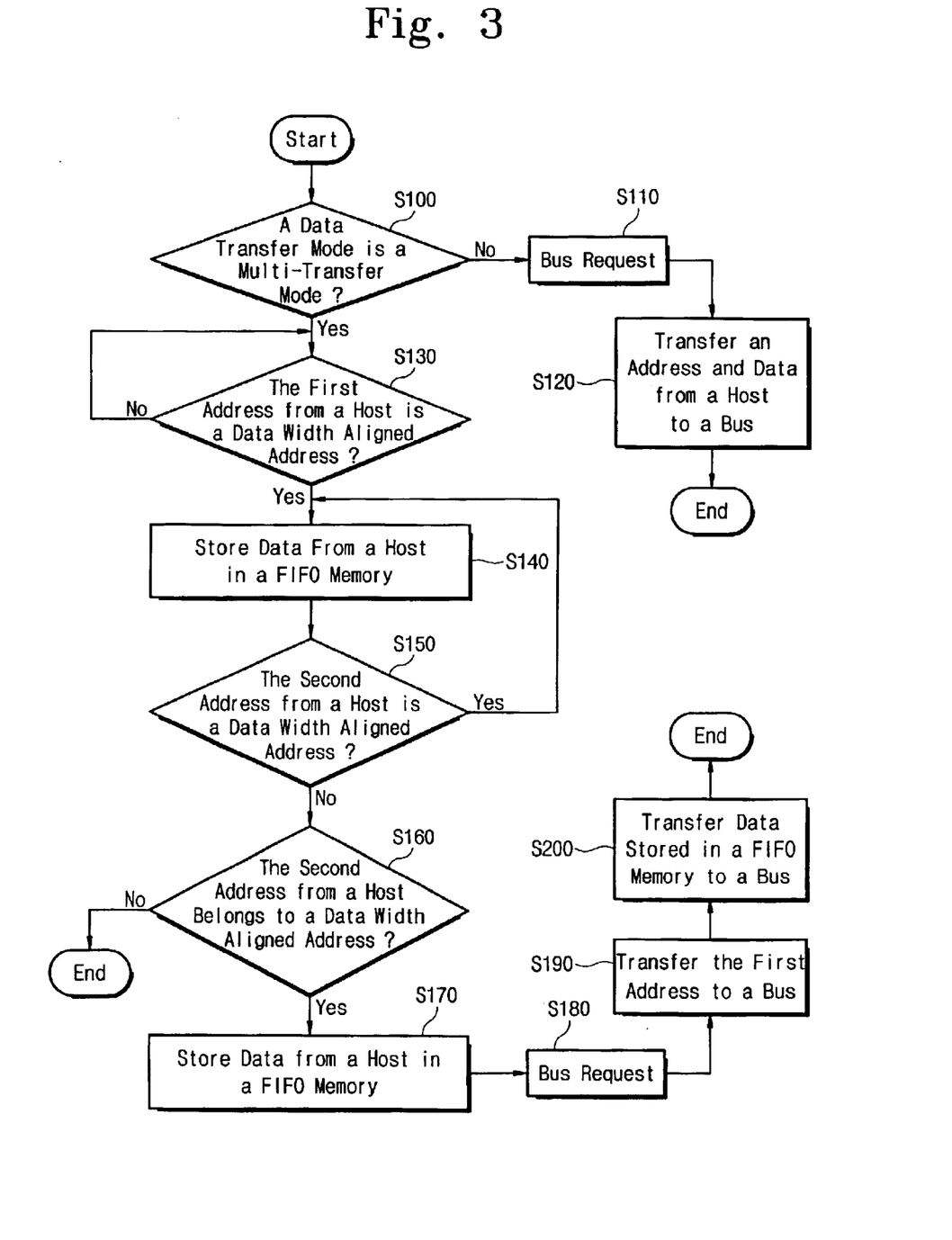
FIG. 3 is a flowchart for describing an operation of a PCMCIA block when data from a host is stored in an external memory.

FIG. 3 is a flowchart for describing an operation of a PCMCIA block when data from a host is stored in an external memory. It is assumed that the PCMCIA block 110 interfaces with the host 200 by the 16-bit unit and that a bus of an SOC 100 has a 32-bit data width.

As illustrated in FIG. 3, in block S100, it is determined whether a data transfer mode of the PCMCIA block 110 is a multi-transfer mode. The data transfer mode of the PCMCIA block 110, as described above, is set in a mode register 500 of the PCMCIA block 110 based on an address, data, and control signals from the host 200. That is, a logic state of a mode flag signal MULTI_MODE is determined according to address, data, and control signals. When the mode flag signal MULTI_MODE indicates a single transfer mode, in block S110, a write FSM 530 makes a request to the bus arbiter 130 for the use of the bus. If the use of the bus of the PCMCIA block 110 is granted, an address and 16-bit data from the host 200 are transmitted to a bus 160 through a bus interface 560 under the control of the write FSM 530 (S120). At the same time, the write FSM 530 converts control signals from the host 200 to an appropriate communication protocol, and transfers the converted control signals to the bus 160. Afterward, 16-bit data transferred to the bus 160 may be stored in an external memory 300 under the control of a memory controller 120, by a well known manner.

If a data transfer mode of the PCMCIA block 110 is a multi-transfer mode, in block S130, an address checking circuit 520 checks whether the first address is a data width (word/double word) aligned address. In this embodiment, since the bus 160 of the SOC 100 has a 32-bit data width, the address checking circuit 520 determines whether the first address is a word aligned address. It is determined by judging whether two least significant bits of the first address are "00". If the first address is not the word aligned address, the PCMCIA block 110 waits until a word aligned address is received. If the first address is a word aligned address, the address checking circuit 520 activates a detection signal DET_WA0 indicating that the first address is a word aligned address. The write FSM 530 controls a FIFO buffer 550 in response to the activated detection signal DET_WA0. That is, in block S140, presently received 16-bit data is stored in the register 553 under the control of a write control logic 551.

Continuously, in block S150, the address checking circuit 520 determines whether the second address from the host 200 is a word aligned address. If the second address is a word aligned address, presently received 16-bit data is stored in the register 553 under the control of the write control logic 551 (S140). That is, in a case where word aligned addresses are sequentially received, 16-bit data corresponding to a previous word aligned address is initialized (or overwritten) by 16-bit data corresponding to a current word aligned address. In block S150, if the second address is not a word aligned address, there is checked whether the second address belongs to the word aligned address range (S160). If not, a current data transfer operation is completed.

If the second address belongs to a word aligned address range, in block S170, presently transferred 16-bit data is stored in the register 553 under the control of the write control logic 551. That is, the address checking circuit 520 activates the second detection signal DET_WT1 indicating that the second address belongs to a word aligned address range. The write FSM 530 responds to the activated detection signal DET_WA1 and causes the 16-bit data to be stored in the register 553 under the control of the write control logic 551. The first and second addresses from the host 200 are independent within a word aligned address range. Accordingly, 32-bit data is temporarily stored in the FIFO buffer 550.

Afterward, in block S180, the write FSM 530 makes a request to the bus arbiter 130 for use of the bus. If bus use of the PCMCIA block 110 is granted, in block S190, a word aligned address (that is, the first address) stored in the address checking circuit 520 is transmitted to the bus 160 through the bus interface 560. In block S200, 32-bit data stored in the FIFO buffer 550 is loaded on the bus 160 under the control of the write FSM 530. The write FSM 530 converts control signals from the host 200 to an appropriate communication protocol of the bus 160, and transmits the converted control signals to the bus 160. After this, 32-bit data on the bus 160 is stored in the external memory 300 under the control of the memory controller 120.

Figure 4A:
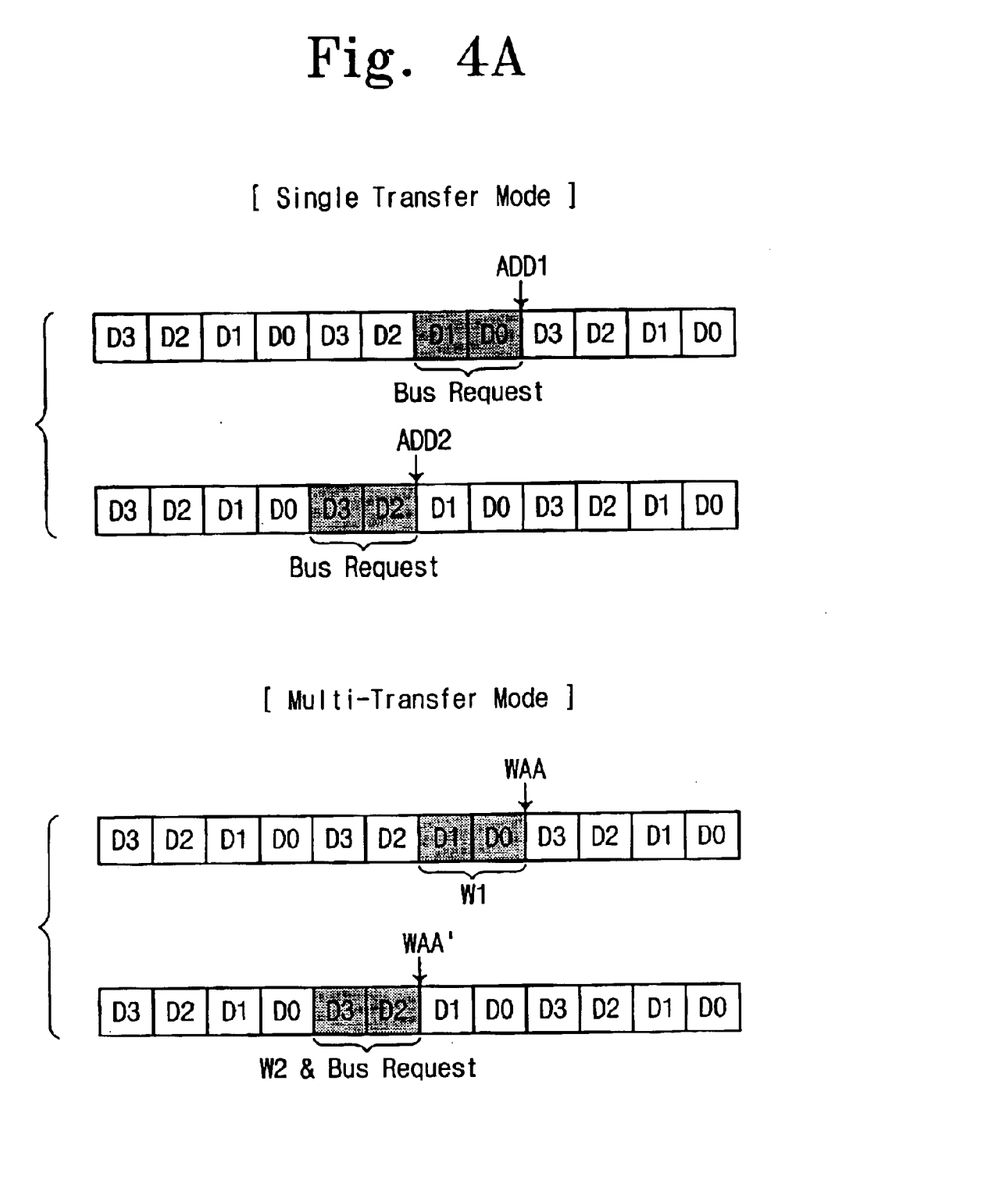
FIGS. 4A and 4B are a diagram showing bus request numbers when performing a data write operation using the present multi-transfer manner and a conventional single transfer manner.

FIG. 4A shows a bus request frequency when a data write operation is carried out using the present multi-transfer method and a conventional single transfer method. In FIG. 4A, in a single transfer mode, where a PCMCIA block 110 interfaces with a host 200 by the 16-bit unit, transmission of 32-bit data to a bus 160 is as follows. If the first address ADD1 is transferred from the host 200 to a PCMCIA block 110, the PCMCIA block 110 makes a request of the bus arbiter 130 for bus use. If bus use is granted, the first address ADD1 and corresponding 16-bit data are loaded on the bus 160. If the second address ADD2 is transferred from the host 200 to the PCMCIA block 110, the PCMCIA block 110 makes another a request of the bus arbiter 130 for bus use. If bus use is granted, the second address ADD2 and 16-bit data are loaded on the bus 160. Thus, in a case where 32-bit data is transmitted to an external memory at the single transfer mode, the PCMCIA block 110 holds the bus 160 two times.

In a case where the PCMCIA block 110 interfaces with the host 200 by the 16-bit unit, transmission of 32-bit data to the bus 160 is as follows. If the first address or a word aligned address WAA is transferred from the host to the PCMCIA block 110, 16-bit data D1D0 corresponding to the word aligned address WAA is temporarily stored in the FIFO buffer 550. And then, if an address WAA' belonging to a word aligned address range is transferred from the host 200 to the PCMCIA block 110, 16-bit data D3D2 corresponding to the next address WAA' is temporarily stored in the FIFO buffer 550. At the same time, the PCMCIA block 110 makes a request of the bus arbiter 130 for bus use. If bus use is granted, 32-bit data stored in the FIFO buffer 550 is loaded on the bus 160. Afterward, a write operation will be carried out according to the control of a memory controller.

That is, in the case that 32-bit data is transferred to the external memory 300 in the multi-transfer mode. The PCMCIA block 110 stores 16-bit data in the FIFO buffer 550 two times, and 32-bit data is transferred to the bus 160. Therefore, the 32-bit bus 160 is used only one time. In case of transmitting data using the PCMCIA block 110 according to the present invention, the bus 160 of the SOC 100 has an improved level of availability to other high-speed masters. That is, a system performance can be improved.

If a host 200 transfers the first 16-bit data and does not transfer the second 16-bit data in a predetermined time in a write operation of a multi transfer mode, the PCMCIA block 110 informs the host 200 of a failure of data transmission through an interrupt signal and an interrupt state register (not shown). This prevents a system from entering a hang-up state when the second data is not transferred from the host 200 because of an error, wherein transmission of valid data to the host is needed. At a state satisfying an initial address condition (e.g., an address is a word aligned address), an input order of next addresses is not important within the word aligned address range.

Figure 4B:
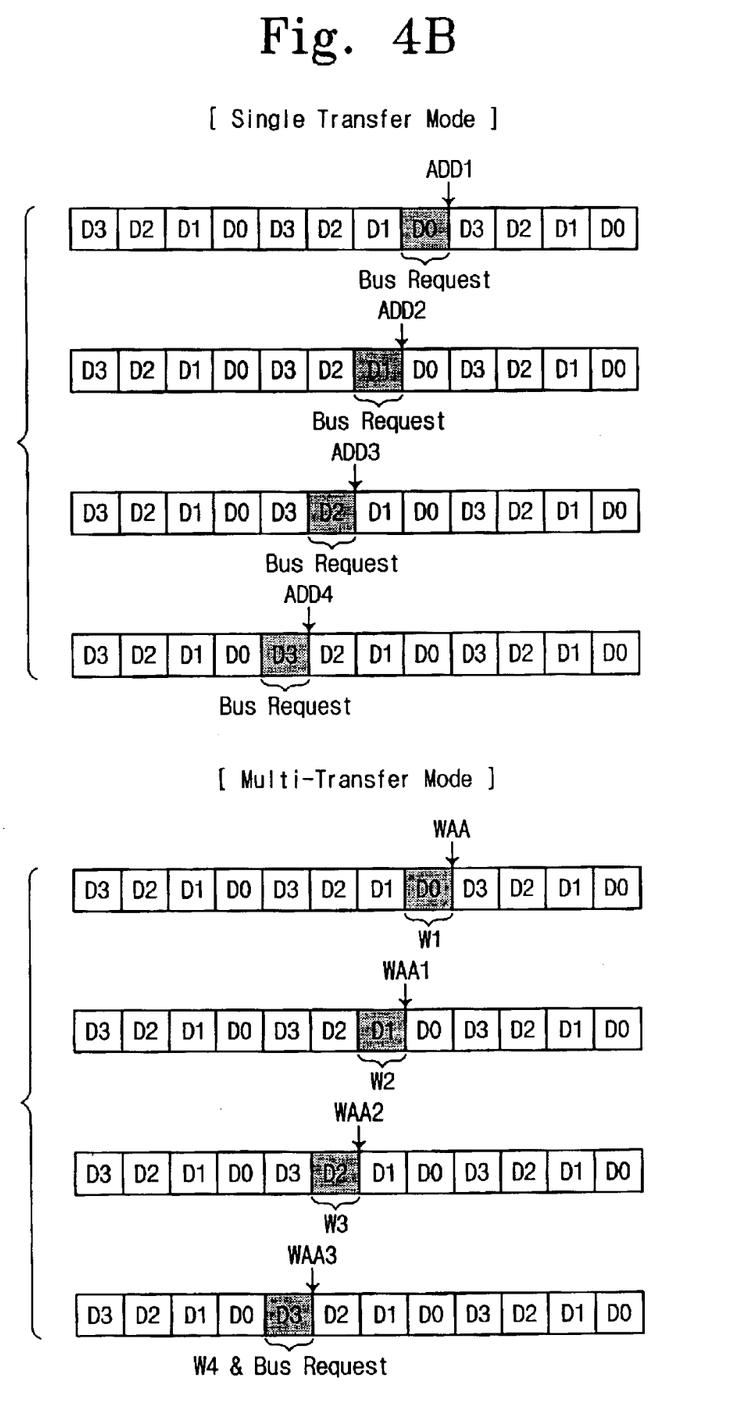

FIG. 4B shows a bus request frequency when a data write operation is carried out using the present multi-transfer method and a conventional transfer method. When transmitting 32-bit data to a bus 160 at a single transfer mode where a PCMCIA block 110 interfaces with a host 200 by the 8-bit unit, as illustrated in FIG. 4B, four bus requests are needed. On the other hand, when transmitting 32-bit data to the bus 160 at a multi-transfer mode where the PCMCIA block 110 interfaces with the host 200 by the 8-bit unit, as illustrated in FIG. 4B, one bus request is needed.

Figure 5:
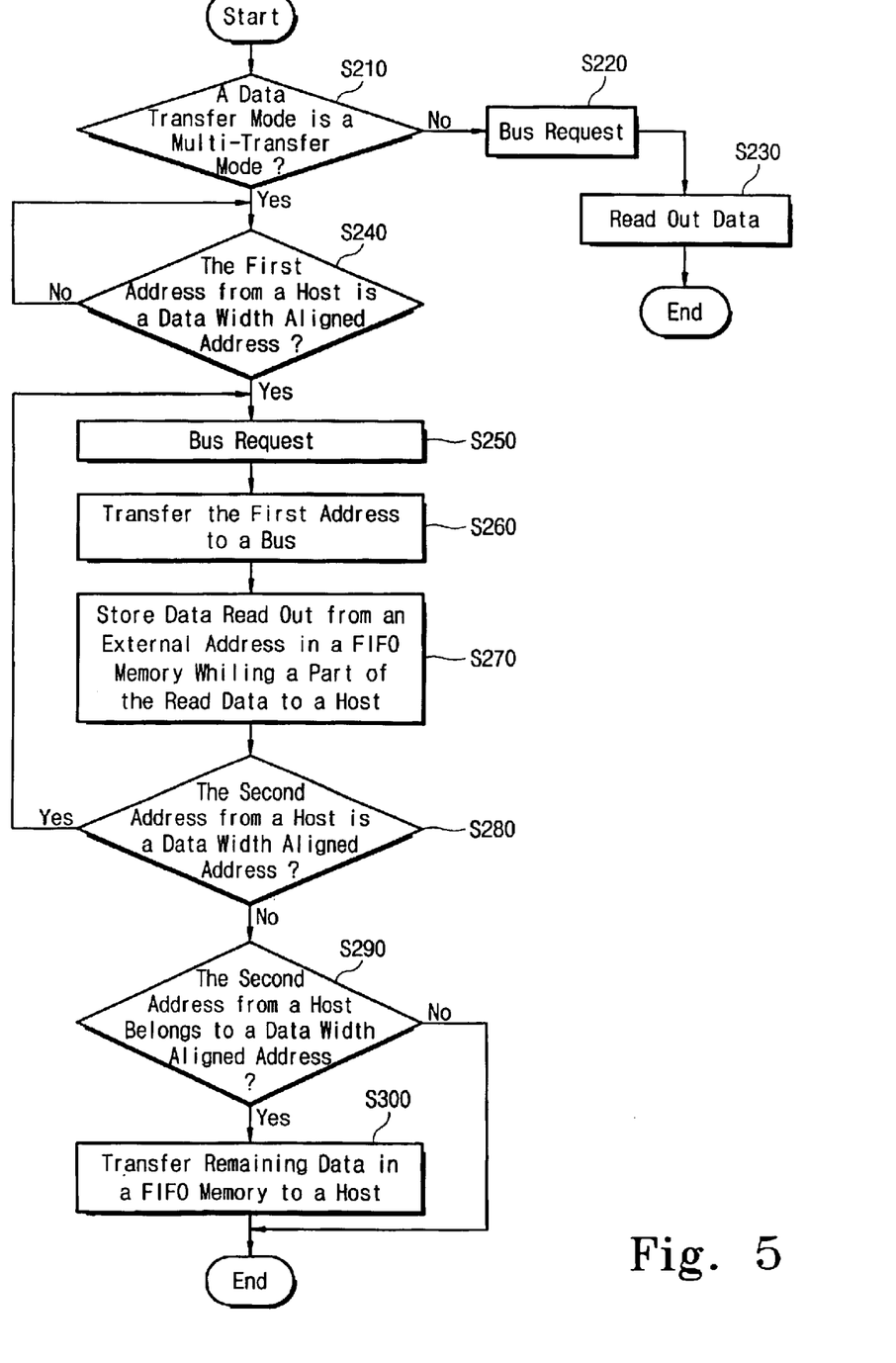
FIG. 5 is a flowchart for describing an operation of a PCMCIA block when data read out from an external memory is transmitted to a host.

FIG. 5 is a flowchart for describing an operation of a PCMCIA block when data read out from an external memory is transferred to a host. It is assumed that a PCMCIA block 110 interfaces with a host 200 by the 16-bit unit and that a bus 160 of an SOC 100 has a 32-bit data width.

In block S210, it is determined whether a data transfer mode of the PCMCIA block 110 is a multi-transfer mode. As aforementioned, the mode register 500 of the PCMCIA block 110 is set based on an address, data, and control signals from the host 200. That is, a logic state of a mode flag signal MULTI_MODE is determined according to the mode register 500. When the mode flag signal MULTI_MODE indicates a single transfer mode, in block S220, a read FSM 540 makes a request of the bus arbiter 130 for use of the bus. If the bus use of the PCMCIA block 110 is granted, an address from the host 200 is transmitted to a bus 160 through a bus interface 560 under the control of the read FSM 540 (S220). At the same time, the read FSM 540 converts control signals from the host 200 to an appropriate communication protocol, and transfers the converted control signals to the bus 160. Afterward, in block S230, 16-bit data transferred to the bus 160 may be read out from an external memory 300 under the control of a memory controller 120. 16-bit data thus read out is transferred to the host 200 through the PCMCIA block 110. At the single transfer mode, a FIFO memory 550 does not operate.

If a data transfer mode is a multi-transfer mode, in block S240, an address checking circuit 520 determines whether a current address as the first address is a word aligned address. This is accomplished by determining whether two least significant bits of the first address are "00". If the first address is not a word aligned address, the PCMCIA block 110 waits until a word aligned address is received. If the first address is a word aligned address, in block S250, the read FSM 540 makes a request of the bus arbiter 130 for use of the bus. If bus use is granted, a word aligned address, that is, the first address from the host 200 is loaded on the bus 160 via the bus interface 560 (S260). At the same time, the read FSM 540 converts control signals from the host 200 to an appropriate communication protocol and loads the converted control signals on the bus 160 via the bus interface 560.

Afterward, data stored in the external memory 300 is read out under the control of a memory controller 120, and the read-out data is loaded on the bus 160. At this time, data is read out by the 32-bit unit. In block S270, 32-bit data loaded on the bus 160 is stored in the FIFO buffer 550 under the control of the read FSM 540. Simultaneously, 16-bit data corresponding to the word aligned address (i.e., the first address) is transferred to the host 200.

Continuously, in block S280, the address checking circuit 520 determines whether the second address transferred from the host 200 is a word aligned address. If so, the procedure goes to block S250. That is, a read operation is repeated, as described above, using a presently transferred word aligned address. If not, in block S290, it is determined whether the second address belongs to a word aligned address range. If not, a data transfer operation is completed. If the second address belongs to a word aligned address range, in block S300, remaining 16-bit data in the FIFO buffer 550 is transferred to the host 200 under the control of the read FSM 540.

Figure 6A:
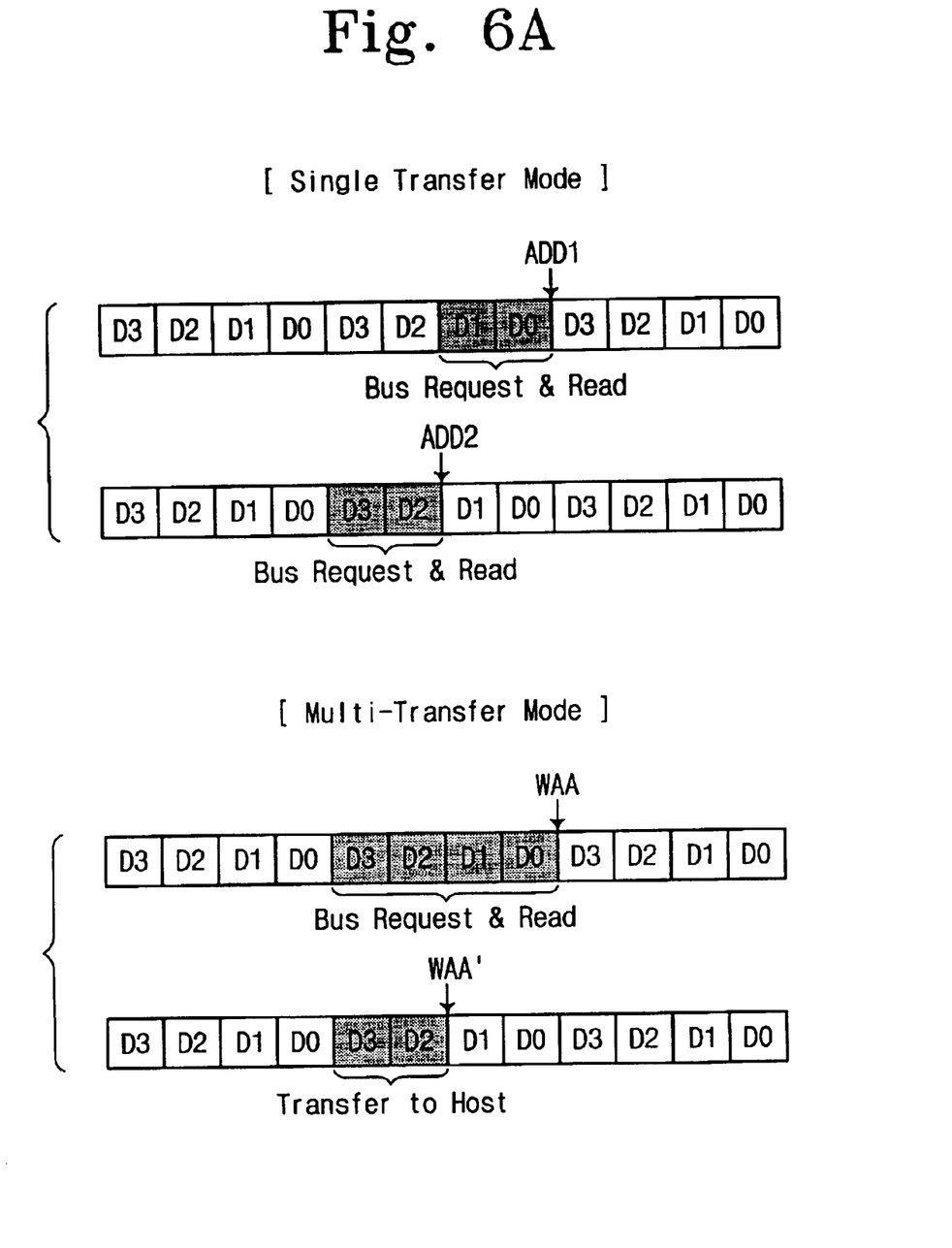
FIGS. 6A and 6B are a diagram showing bus request numbers when performing a data read operation using the present multi-transfer manner and a conventional single transfer manner.

FIG. 6A shows a bus request frequency when a data read operation of an external memory is carried out using the present multi-transfer method and a conventional single transfer method. In FIG. 6A, in the case of a single transfer mode where a PCMCIA block 110 interfaces with a host 200 by the 16-bit unit, the PCMCIA block 110 makes a request of the bus arbiter 130 for use of the bus when the first address ADD1 from the host 200 is received. If bus use is granted, a read operation of an external memory 300 will be carried out. Data read out from the external memory 300 is transmitted to the host 200 through a memory controller 120, a bus 160, and the PCMCIA block 110. The PCMCIA block 110 makes another request of the bus arbiter 130 for use of the bus when the second address ADD2 from the host 200 is received. If bus use is granted, a read operation of the external memory 300 will be carried out. Data read out from the external memory 300 is transmitted to the host 200 through a memory controller 120, a bus 160, and the PCMCIA block 110. As a result, in the case of reading out 32-bit data from the external memory 300 at the single transfer mode, the PCMCIA block 110 uses the bus 160 two times.

In case of a multi-transfer mode where the PCMCIA block 110 interfaces with the host 200 by the 16-bit unit, a word aligned address WAA is transferred to the PCMCIA block 110 from the host 200. The PCMCIA block 110 makes a request of the bus arbiter 130 for use of the bus. If bus use is granted, the word aligned address is loaded on the bus 160. Afterward, 32-bit data is read out from the external memory 300 under the control of the memory controller 120, and the read-out 32-bit data is stored in the FIFO buffer 550 of the PCMCIA block 110. Simultaneously, 16-bit data is transmitted to the host 200. And then, when an address WAA' belonging to a word aligned address range is transmitted from the host 200 to the PCMCIA block 110, remaining 16-bit data in the FIFO buffer 550 is transmitted to the host 200.

With the above description, when transferring 32-bit data from the external memory to the host at the multi-transfer mode, the PCMCIA block 110 uses a 32-bit bus 160 one time by storing 32-bit data in the FIFO buffer 550 and transferring the stored data to the host 200. Accordingly, in the case of transmitting data using the PCMCIA block 110 according to the present invention, the bus 160 of the SOC 100 will have an improved availability to the high-speed masters.

Figure 6B:
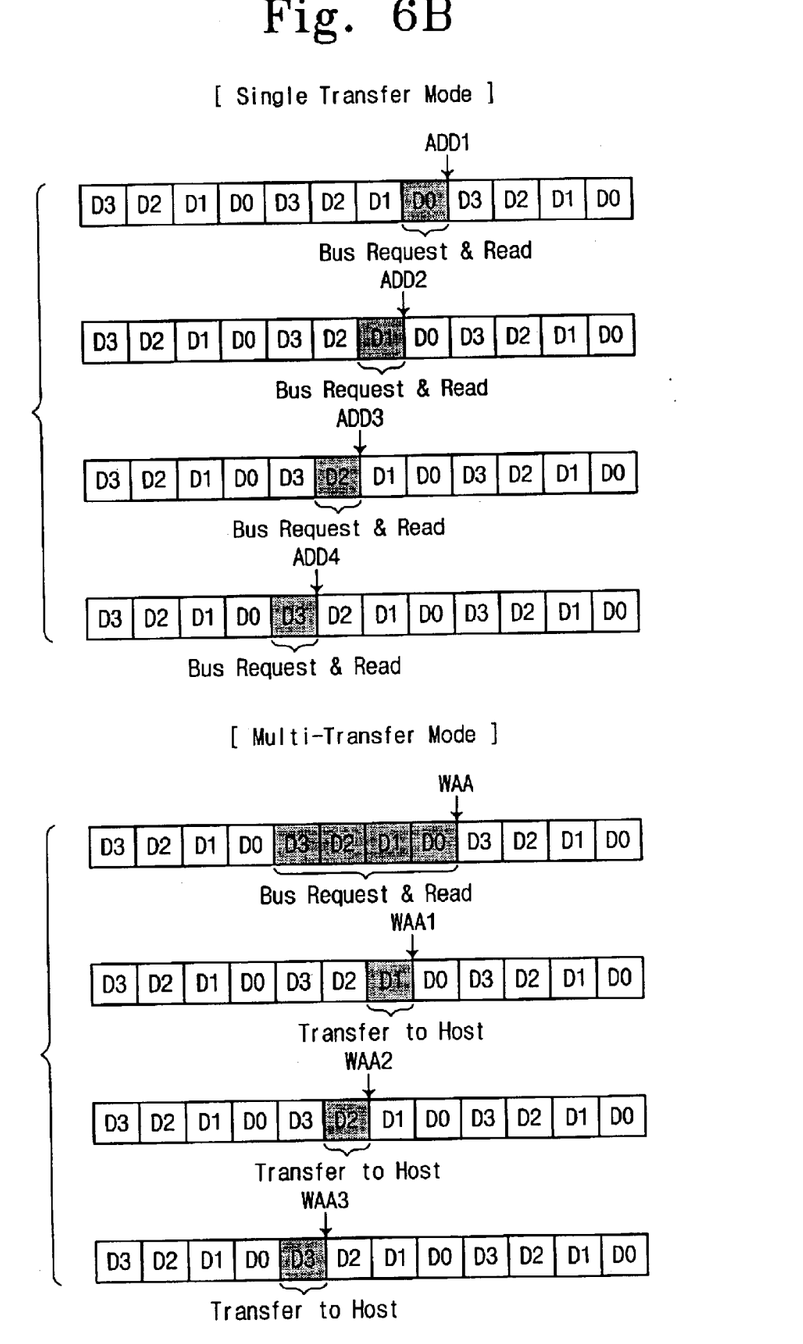

FIG. 6B shows a bus request frequency when a data read operation is carried out using the present multi-transfer method and a conventional transfer method. When transmitting 32-bit data to a bus 160 at a single transfer mode where a PCMCIA block 110 interfaces with a host 200 by the 8-bit unit, as illustrated in FIG. 6B, four bus requests are needed. On the other hand, when transmitting 32-bit data to the bus 160 at a multi-transfer mode where the PCMCIA block 110 interfaces with the host 200 by the 8-bit unit, as illustrated in FIG. 6B, one bus request is needed. Therefore, a system bus performance can be improved.

The present invention has been described using a 32-bit bus system, but it is obvious that the present invention can be applied to a 64-bit bus system or a bus system having a wider data width. In additional, the present invention can be applied to a master or a slave that operates at a low speed and has a narrow data width. Results obtained by implementing the present invention may be higher when processing the data continuously. The scope of the claims, therefore, should be accorded the broadest interpretation so as to encompass all such modifications and similar arrangements.

What is claimed is:

1. An interface device for interfacing with a host by an m-bit unit, comprising:
   a first-in first-out (FIFO) memory for storing data;
   a flag signal generator circuit for generating a mode flag signal indicating whether a data transfer mode of the interface device is a multi-transfer mode where n-bit data is transmitted from the device to an n-bit bus, wherein n is integral times of m;
   an address checking circuit for generating a first detection signal and a second detection signal when the mode flag signal indicates the multi-transfer mode, the first detection signal indicating whether a first address from the host is a data width aligned address and the second detection signal indicating whether a second address from the host belongs to a data width aligned address range; and
   a control circuit for enabling m-bit data from the host to be stored in the FIFO memory as n-bit data in response to the first detection signal and the second detection signal, when the mode flag signal indicates the multi-transfer mode,
   wherein when the n-bit data is stored in the FIFO memory, the control circuit causes the stored n-bit data in the FIFO memory to be transmitted to the n-bit bus through a bus interface.

2. The interface device according to claim 1, wherein when data width aligned addresses are continuously received from the host, the control circuit initializes the FIFO memory and, simultaneously, makes m-bit data corresponding to a data width aligned address of the latter be stored in the FIFO memory.

3. The interface device according to claim 1, wherein the flag signal generator circuit is set by the host so that the mode flag signal indicates one of the multi-transfer mode and a single transfer mode, m-bit data from the host being transmitted directly to the n-bit bus at the single transfer mode.

4. The interface device according to claim 1, wherein when n-bit data is transferred from the n-bit bus at the multi-transfer mode, the control circuit causes the n-bit data to be stored in the FIFO memory as n-bit data.

5. The interface device according to claim 4, wherein the n-bit data from the n-bit bus is stored in the FIFO memory and, simultaneously, m-bit data of the n-bit data is transmitted to the host.

6. The interface device according to claim 5, wherein when an address belonging to the data width aligned address range is transmitted from the host at the multi-transfer mode, remaining data stored in the FIFO memory is transmitted to the host.

7. The interface device according to claim 3, wherein when the mode flag signal indicates the single transfer mode, m-bit data from the host is transmitted directly to the n-bit bus.

8. The interface device according to claim 1, wherein a read/write operation of the FIFO memory is carried out irrespective of an address order within the data width aligned address range.

9. A system on a chip comprising:
   an n-bit bus;
   a bus arbiter that arbitrates the n-bit bus;
   an interface device connected to the n-bit bus and interfacing with a host by the m-bit unit, wherein n is integral times of m; and
   a memory controller connected to the n-bit bus controlling an access to an external memory,
   wherein the interface device comprises:
   a first-in first-out (FIFO) memory for storing data;
   a flag signal generator circuit for generating a mode flag signal indicating whether a data transfer mode of the interface device is a multi-transfer mode where n-bit data is transmitted from the interface device to the n-bit bus;
   an address checking circuit for generating a first detection signal and a second detection signal when the mode flag signal indicates the multi-transfer mode, the first detection signal indicating whether a first address from the host is a data width aligned address and the second detection signal indicating whether a second address from the host belongs to a data width aligned address range; and
   a control circuit for enabling m-bit data from the host to be stored continuously in the FIFO memory as n-bit data in response to the first detection signal and the second detection signal, when the mode flag signal indicates the multi-transfer mode,
   wherein when all of the n-bit data is stored in the FIFO memory, the control circuit makes a request of the bus arbiter for bus use, and causes the stored n-bit data in the FIFO memory to be transmitted to the n-bit bus through a bus interface when the bus use is granted.

10. The system on a chip according to claim 9, wherein when data width aligned addresses are continuously received from the host, the control circuit initializes the FIFO memory and, simultaneously, makes m-bit data corresponding to data width aligned addresses to be stored in the FIFO memory.

11. The system on a chip according to claim 9, wherein the flag signal generator circuit is set by the host so that the mode flag signal indicates one of the multi-transfer mode and a single transfer mode, m-bit data from the host being transmitted directly to the n-bit bus at the single transfer mode.

12. The system on a chip according to claim 9, wherein the control circuit causes n-bit data from the n-bit bus to be stored in the FIFO memory at the multi-transfer mode.

13. The system on a chip according to claim 12, wherein the n-bit data from the n-bit bus is stored in the FIFO memory and, simultaneously, m-bit data of the n-bit data is transmitted to the host.

14. The system on a chip according to claim 13, wherein when an address belonging to the data width aligned address range is transmitted from the host at the multi-transfer mode, remaining data stored in the FIFO memory is transmitted to the host.

15. The system on a chip according to claim 12, wherein when the mode flag signal indicates the single transfer mode, m-bit data from the host is transmitted directly to the n-bit bus.

16. The system on a chip according to claim 9, wherein a read/write operation of the FIFO memory is carried out irrespective of an address order within the data width aligned address range.

17. An operation method of an interface device which interfaces with a host by an m-bit unit, comprising the steps of:

storing m-bit data corresponding to a first address from the host in a first-in first-out (FIFO) memory when the first address from the host is a data width aligned address, during a multi-transfer mode where n-bit data is transmitted from the interface device to an n-bit bus, wherein n is integral times of m;

storing m-bit data corresponding to a second address in the FIFO memory when the second address belongs to a data width aligned address range;

requesting a bus use from a bus arbiter when the FIFO memory is filled with the n-bit data; and transmitting the n-bit data stored in the FIFO memory to the n-bit bus when the bus use is granted.

18. The operation method according to claim 17, wherein when the second address is a data width aligned address, data corresponding to the second address is overwritten on data corresponding to the first address.

19. The operation method according to claim 17, further comprising the steps of:

requesting a bus use from the bus arbiter when an address is received from the host, during a single transfer mode where m-bit data is transmitted to the n-bit bus; and transmitting the m-bit data corresponding to the address onto the n-bit bus when the bus use is granted.

20. An operation method of an interface device which interfaces with a host by an m-bit unit, comprising the steps of:

discriminating whether a first address from the host is a data width aligned address, during a multi-transfer mode where n-bit data is transmitted from the interface device to an n-bit bus, wherein n is integral times of m;

requesting a bus use from a bus arbiter when the first address is the data width aligned address;

storing n-bit data corresponding to the first address while transmitting m-bit data of the n-bit data to the host; and transmitting remaining data of the n-bit data to the host when a second address belonging to a data width aligned address range is received from the host.

21. The operation method according to claim 20, wherein the steps of requesting and transmitting are repeated when the second address from the host is the data width aligned address.

22. The operation method according to claim 20, further comprising the steps of:

requesting a bus use from the bus arbiter when an address is received from the host, during a single transfer mode where m-bit data is transmitted to the n-bit bus from the interface device; and transmitting the m-bit data corresponding to the address onto the n-bit bus when the bus use is granted.

* * * * *